United States Patent [11] 3,615,201

| [72] | Inventors | Tullio Cesca<br>Milan;<br>Bruno Pescarolo, Milan; Remo Monaldi, Vercelli, all of Italy |
|---|---|---|
| [21] | Appl. No. | 742,157 |
| [22] | Filed | July 3, 1968 |
| [45] | Patented | Oct. 26, 1971 |
| [73] | Assignee | Montecatine Edison S.p.A.<br>Milan, Italy |
| [32] | Priority | July 5, 1967 |
| [33] | | Italy |
| [31] | | 18021A/67 |

[54] PROCESS FOR THE PRODUCTION OF MAGNESIUM OXIDE
7 Claims, No Drawings

[52] U.S. Cl. .................................................. 23/201, 23/67
[51] Int. Cl. .................................................. C01f 5/20, C01f 5/24
[50] Field of Search ............................................. 23/201, 67

[56] References Cited
UNITED STATES PATENTS

| 1,163,475 | 12/1915 | Silbermann .................. | 23/67 |
| 2,396,915 | 3/1946 | Greider ........................ | 23/67 |
| 2,765,212 | 10/1956 | Froelich ....................... | 23/67 |

FOREIGN PATENTS

| 1,183,851 | 12/1964 | Germany ..................... | 23/201 |

Primary Examiner—Oscar R. Vertiz
Assistant Examiner—G. Alvaro
Attorney—Stevens, Davis, Miller & Mosher

ABSTRACT: Magnesium oxide is produced by precipitating the hydrated magnesium carbonate resulting from the reaction of a saturated solution of magnesium sulfate with solid ammonium bicarbonate in the presence of a dilute solution of ammonium sulfate; drying the crystalline fraction thus obtained; and thence calcining the same.

PROCESS FOR THE PRODUCTION OF MAGNESIUM OXIDE

BACKGROUND OF THE INVENTION

1. Field of the Invention

The present invention relates to a process for the production of magnesium oxide. More particularly, the invention relates to the production of magnesium oxide from anhydrous magnesium sulfate or magnesium sulfate heptahydrate derived from any source whatsoever, such as, for example, the crystallizate emanating from the mother liquors in the processing of potassium minerals. The magnesium oxide thus obtained according to the invention is of a very high purity and exhibits unique physical characteristics, namely, a high iodine number or "surface activity" which renders same particularly suited for use as a "halogen-acceptor" in the vulcanization of chlorinated and fluorinated elastomers.

1. Description of the Prior Art

It is known according to certain prior art techniques that a high purity magnesium oxide can be produced by calcining the carbonate precipitated by means of carbon dioxide and ammonia from magnesium sulfate solutions.

It is also known according to such prior art, however, that said precipitation of magnesium carbonate from magnesium sulfate solutions may present various difficulties and drawbacks, that is:

i. Instead of hydrated $MgCO_3$, there generally precipitates the double magnesium and ammonium carbonate, according to the reaction:

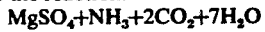
$MgCO_3 \cdot (NH_4)_2CO_3 4H_2O + (NH_4)_2SO_4 + H_2O$ (accompanied by basic magnesium sulfates which pollute the resultant carbonate and the magnesium oxide);

ii. The double magnesium and ammonium carbonate and the basic magnesium sulfates precipitate in the form of microcrystals, and, therefore, are difficult to filter and purify, even upon prolonged washing with water; and iii. The precipitation of the magnesium carbonate is incomplete, with part of the magnesium sulfate remaining in the ammonium sulfate solutions thus lowering the titer of the agricultural crystallized ammonium sulfate.

It has also been suggested in the art to precipitate, under particular conditions, the double magnesium and hydrated ammonium carbonate and thence to decompose same with further magnesium sulfate in order to obtain a sufficiently pure magnesium carbonate. This process, though it attains its purpose, is rather cumbersome and laborious.

SUMMARY OF THE INVENTION

The process according to the present invention, on the other hand, permits one to overcome all of the difficulties and to eliminate all of the drawbacks mentioned above, and in comparison with the processes heretofore known in the art, it offers the following advantages:

a. The precipitation of hydrated magnesium carbonate, $MgCO_3 \cdot 3H_2O$, is conducted in a single, very readily performed operation;

b. The hydrated magnesium carbonate is precipitated in the pure state and therefore is free of either double or basic magnesium and ammonium salts;

c. Furthermore, the hydrated magnesium carbonate precipitates, when the hereinbelow indicated procedures are observed, in the form of relatively well defined and developed crystals, which may be readily filtered and washed by means of conventional filtering devices while maintaining the volumes of washing water within those quantities strictly required by the precipitation reaction, as is more fully discussed infra;

d. In the precipitation phase of the hydrated magnesium carbonate, there is realized a high yield in the exchange between the magnesium sulfate and the ammonium bicarbonate, wherefore the ammonium sulfate solution, after filtration of the precipitated magnesium carbonate, contains but modest percentages of magnesium and thus can be directly employed in the processing of complex fertilizers, particularly according to the double exchange process described in the instant Assignee's Italian Pat. No. 698,472;

e. The precipitation reaction of the magnesium carbonate is conducted in such manner that the total volumes of circulating water are kept within strict limits, so as to considerably reduce the cost of the concentration of the filtered solution when it is desired to obtain therefrom ammonium sulfate crystals;

f. The use of solid ammonium bicarbonate in the precipitation operation of the magnesium carbonate according to the present invention, in comparison with other known processing systems, obviates the need for employing an excess of ammonia which, having to have been neutralized by means of considerable quantities of sulfuric acid, would reduce the economic feasibility of the operation; and g. Lastly, the realization according to the invention of a high purity calcined magnesium oxide possessing unique physical characteristics and suited for the aforesaid uses, together with the utilization of the ammonium sulfate, render the subject process economically advantageous and therefore commercially interesting.

DESCRIPTION OF THE PREFERRED EMBODIMENTS

The process according to the invention comprises precipitating the hydrated magnesium carbonate, $MgCO_3 \cdot 3H_2O$, by means of solid ammonium bicarbonate (prepared from recovered $CO_2$ and $NH_3$) according to the following simple equation:

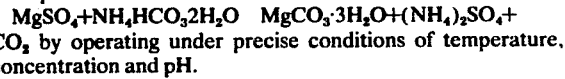
$CO_2$ by operating under precise conditions of temperature, concentration and pH.

More precisely, the process of this invention comprises:

a. Precipitation of the $MgCO_3 \cdot 3H_2O$ by continuously reacting under stirring (1) the dilute ammonium sulfate solution coming from the washing of the magnesium carbonate (successive operation), (2) calculated amounts of a saturated solution of magnesium sulfate and (3) solid ammonium bicarbonate.

During this operation, whose duration is about 30–50 minutes, the temperature of the slurry is maintained at between 50° and 70°C., but preferably between 60°–65°C.

The pH must be comprised between 6 and 8, but preferably should be about 7.5. The ammonium bicarbonate is employed in an excess of about 10 percent over that stoichiometrically required.

The reaction slurry is then brought to a temperature of from 70°–75°C. and maintained at this level for about 15 minutes; thereafter it is cooled under slow stirring to a temperature of from about 25°C. to 35°C. for a period of about 2–3 hours.

b. Filtering and washing of the $MgCO_3 \cdot 3H_2O$: the slurry, containing in suspension the $MgCO_3 \cdot 3H_2O$ that has precipitated, upon aging for 2 hours which primarily serves to permit the crystals of the precipitate to grow, is then filtered on a filter, either under vacuum or in a centrifuge.

The $MgCO_3 \cdot 3H_2O$ is then washed in countercurrent, first with weak ammonium sulfate solutions and then with water. The concentrated solutions of the initial filtration are conveyed for the utilization of the ammonium sulfate contained therein; and the diluted solutions are recycled to the first stage of the cycle, namely, to the precipitation phase of the magnesium carbonate.

c. Drying and calcining of the $MgCO_3 \cdot 3H_2O$: the magnesium carbonate crystals, upon extraction from the filter and while still moist, are first dried at a temperature of about 200°C. and the dry $MgCO_3$ is next calcined at a temperature of from 500°–600°C., with the calcining times being determined in such manner that the MgO thus obtained still has a residual humidity of 3–4 percent. This is because of the fact that it is known that when MgO is "calcined to death" it loses its unique physical characteristics and does not have a sufficient "surface activity."

The $CO_2$ evolved during the precipitation phase of the $MgCO_3 \cdot 3H_2O$ and during the calcination phase is recovered and utilized for producing further ammonium bicarbonate according to techniques well known in the art.

d. Utilization of the ammonium sulfate solutions: the concentrated solution filtered from the precipitated magnesium carbonate may be directly employed in the production of complex fertilizers or purified by the addition of phosphoric acid and $NH_3$ in order to eliminate the residual magnesium remaining in solution; it is then brought to a pH of 6 by means of $H_2SO_4$; and ultimately it is concentrated and crystallized in order to obtain agricultural grade ammonium sulfate at 21 percent of nitrogen, by following standard procedures for the production of such fertilizers.

In order to further illustrate the instant invention and the advantages thereof, the following specific example is given, it being understood that the same is merely intended to be illustrative and in no wise limitative.

EXAMPLE 684.8 g. of $MgSO_4 \cdot 7H_2O$, deriving from the fractional crystallization of the solutions resulting from the processing of potassium minerals, were dissolved in 590.7 g. of water. In the presence of 993.3 g. of a dilute solution of ammonium sulfate containing 100 g. of $(NH_4)_2SO_4$, there were made to react 489.5 g. of $NH_4 \cdot HCO_3$ with the above saturated solution of $MgSO_4 \cdot 7bH_2O$. During the reaction, which was conducted under suitable stirring, the temperature was maintained at about 60°–65° C., and was then increased to 70°–75° C. The pH of the slurry was found to be about 7.5.

During the reaction, which had a total duration of about 40 minutes, there developed 134.1 g. of $CO_2$ and 19.1 g. of $NH_3$, the latter coming from a limited decomposition of the ammonium bicarbonate, which substances were conveyed to the production of further ammonium bicarbonate. The reaction slurry was then cooled to about 25°–30° C. and maintained at this level under constant stirring for an additional 2 hours. In this manner there were obtained 2605.1 g. of slurry, which was then filtered. The cake was then washed on a filter, first with the dilute ammonium sulfate solution of the recycle, and then with 883 g. of water.

There were obtained 1,930.4 g. of solution, which contained 340 g. of $(NH_4)_2SO_4$; 993.3 g. of dilute solution, which was recycled; and 566.4 g. of $MgCO_3 \cdot 3H_2O$ with a moisture content of 44.2 percent. The humid $MgCO_3 \cdot 3H_2O$ was then dried at a temperature of about 200° C. and there were next obtained 197.68 g. of dried $MgCO_3$, which exhibited the following composition:

| | |
|---|---|
| MgO | 48.8% |
| $CO_2$ | 49.1% |
| $SO_3$ | 0.1% |
| $NH_3$ | 0.3% |
| $H_2O$ | 1.5% |
| Undetermined substances | 0.2% |

The dried $MgCO_3$ was ultimately calcined at a temperature of from 500°–600° C. for about 30 minutes, there being obtained thereby 100 g. of MgO which exhibited the following chemical-physical characteristics:

| | |
|---|---|
| Residual humidity | 3 % |
| MgO | 99.5 % |
| $H_2O$ | 0.02% |
| CaO | absent |
| $Fe_2O_3$ | 0.004% |
| $SO_3$ | 0.15% |
| Cl | 0.03% |
| $CO_2$ | absent |
| $NH_3$ | undeterminable traces |
| soluble in HCl | completely |
| iodine number | 94 |
| degree of whiteness | 98 |

During the calcination phase there were also obtained 97.1 g. of $CO_2$ and 0.58 g. of $NH_3$, which were recovered and conveyed to the production of $NH_4HCO_3$.

The concentrated solution of $(NH_4)_2SO_4$ was then purified by treating it with 91 g. of $H_3PO_4$ at 28 percent of $P_2O_5$, and 34.7 g. of $NH_3$. Thereby were separated 101.4 g. of magnesium ammonium phosphate $Mg(NH_4)PO_4 \cdot 6H_2O$.

The purified solution, amounting to 1,954.7 g., was filtered and clarified and then adjusted to pH 6 with 63.9 g. of $H_2SO_4$ thereupon it was crystallized and 487.4 g. of $(NH_4)_2SO_4$ at 21 percent of nitrogen were obtained. The calcined MgO, obtained through the process of the invention, was employed in the vulcanization of neoprene and excellent results were obtained, which results are given hereinbelow:

| Formulations: | Recipe 1) | Recipe 2) |
|---|---|---|
| Neoprene WRT (for general uses—type resistant to crystallization; transition resistant) | 100 | |
| Neoprene WHV (for general uses—high viscosity type) | - | 100 |
| PENA (phenyl-β-naphthylamine; antioxidant | 2 | 2 |
| Stearic acid | 0.5 | 0.5 |
| Magnesium oxide | 4 | 4 |
| HAF Black (carbon black of the Cabot Co. Vulcan 3 type; high abrasion) | 50 | 50 |
| Circolight (naphthenic oil; SUN OIL Co, RPo type) | 10 | |
| 790 aromatic oil (SUN OIL CO.) | | 15 |
| Zinc oxide | 5 | 5 |
| Na-22 (2-mercapto-imidazoline; ethylene-Thiourea | 0.5 | 0.5 |

Vulcanization was conducted at 150° C. for 30 minutes.

| Mechanical Properties | Recipe 1) MgO from $MgSO_4$ | Recipe 2) MgO from $MgSO_4$ |
|---|---|---|
| CR (kg./cm.²) (aggregate breaking load) | 188 | 240 |
| AR (%) (ultimate elongation) | 300 | 340 |
| $M_{200}$ (kg./cm.²) (elongation modulus at 200%; corresponding force for these deformations) | 110 | 117 |
| $M_{300}$ (kg./cm.²) (elongation modulus at 300%) | 188 | 205 |
| H (IRHD) (hardness; International Rubber Degree) | 73 | 68 |
| Laceration resistance (kg./cm.) | 47 | 51 |

As many apparently widely different embodiments of this invention may be made without departing from the spirit and scope thereof, it is to be understood that the same is not to be limited to the specific embodiments thereof, except as defined by the appended claims.

We claim:

1. A process for the production of highly pure magnesium oxide suited for use as a halogen-acceptor in the vulcanization of chlorinated and fluorinated elastomers, which comprises:

A. precipitating essentially trihydrated magnesium carbonate in a single stage comprising:
   a. reacting a saturated aqueous solution of magnesium sulfate with solid ammonium bicarbonate in about 10 percent stoichiometric excess, in the presence of a dilute aqueous solution of ammonium sulfate;
   b. said reaction being brought from an initial range of from 50° to 70° C. to a final range of from 70° and 75° C. and at a pH of about 6 to 8;
   c. thence cooling the reaction slurry thus obtained in the previous process steps to a temperature of from about 25°–35 C. and aging the same for a period of from about 2–3 hours;

B. separating from such a slurry a crystalline, trihydrated magnesium carbonate fraction free of either double or basic magnesium and ammonium salts;

C. drying at a temperature of about 200° C. said separated, crystalline, trihydrated magnesium carbonate fraction; and D. thence calcining at a temperature from about 500° to 600° C. said dry crystalline fraction, whereby there is obtained highly pure magnesium oxide.

2. The process as defined by claim 1, wherein the reactants of step (a) are continuously and contemporaneously introduced to the system.

3. The process as defined by claim 1 wherein the initial temperature of step ranges from between about 60° C. to 65° C. and further wherein the pH is about 7.5.

4. The process as defined by claim 2, wherein the separation of step (B) is by centrifuging.

5. The process as defined by claim 1, wherein the separation of step (B) is by vacuum filtration and washing.

6. The process as defined by claim 5, wherein the washing of step (B) is serially conducted in countercurrent, first with a weak ammonium sulfate solution and then with water.

7. The process as defined by claim 6, wherein the dilute solution of ammonium sulfate employed in step (a) comprises a recycle of the dilute wash waters of step (B).